United States Patent
Miyajima et al.

(10) Patent No.: US 7,584,816 B2
(45) Date of Patent: Sep. 8, 2009

(54) POWER STEERING APPARATUS

(75) Inventors: Ayumu Miyajima, Hitachinaka (JP);
Makoto Yamakado, Tsuchiura (JP);
Tooru Takahashi, Hiratsuka (JP);
Yoshitaka Sugiyama, Atsugi (JP);
Naoshi Yamaguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 11/144,671

(22) Filed: Jun. 6, 2005

(65) Prior Publication Data
US 2006/0027418 A1 Feb. 9, 2006

(30) Foreign Application Priority Data
Jun. 8, 2004 (JP) ............................. 2004-170401

(51) Int. Cl.
*B62D 5/06* (2006.01)
(52) U.S. Cl. .................. 180/422; 180/421; 180/423; 180/442
(58) Field of Classification Search ............ 180/422, 180/421, 423, 442, 444, 443, 446
See application file for complete search history.

(56) References Cited
U.S. PATENT DOCUMENTS

| | | | |
|---|---|---|---|
| 4,992,944 A | 2/1991 | Noto | |
| 5,749,431 A * | 5/1998 | Peterson | 180/422 |
| 6,064,166 A * | 5/2000 | Kaji | 318/489 |
| 6,092,012 A * | 7/2000 | Shimizu | 701/41 |
| 6,134,490 A | 10/2000 | Ito et al. | |
| 6,227,328 B1 * | 5/2001 | Shimizu | 180/422 |
| 6,305,489 B1 * | 10/2001 | Kariatsumari | 180/422 |
| 6,542,801 B2 | 4/2003 | Kawashima | |
| 6,886,657 B2 * | 5/2005 | Yokota et al. | 180/422 |
| 7,155,906 B2 * | 1/2007 | Yokota et al. | 60/403 |
| 7,174,988 B2 * | 2/2007 | Sasaki et al. | 180/422 |

FOREIGN PATENT DOCUMENTS

| | | |
|---|---|---|
| DE | 101 63 330 A 1 | 7/2002 |
| EP | 1 138 578 | 10/2001 |
| JP | 08-295257 | 11/1996 |
| JP | 2003-212141 | 7/2003 |
| JP | A-2005-178580 | 7/2005 |

OTHER PUBLICATIONS

"How to Use Brushless DC Motor", Hiroshi Ogino, published by Ohmsha, pp. 16-17.

* cited by examiner

*Primary Examiner*—Lesley D Morris
*Assistant Examiner*—Marlon A Arce
(74) *Attorney, Agent, or Firm*—Antonelli, Terry, Stout & Kraus, LLP.

(57) ABSTRACT

There is provided a power steering system including an electric motor for generating a steering force in response to an command value, and a controller for generating the command value to the electric motor. Here, the controller generates the command value in correspondence with steering state of wheels, thereby controlling torque or rotation number of the electric motor.

11 Claims, 7 Drawing Sheets

POWER STEERING APPARATUS

BACKGROUND OF THE INVENTION

The present invention relates to a power steering system for assisting a wheel steering force. More particularly, it relates to a control system for an electric motor which can exhibit an effect on steering-feel improvements (i.e., assist-force enhancement and micro-vibration suppression) in a steering wheel.

As a power assist system for assisting the wheel steering force in response to input of a steering torque from driver, a system which uses a hydraulic mechanism is of ordinary type. As an example of this conventional technology, there exists the following one: Namely, a hydraulic pump is driven by an electric motor so as to generate a hydraulic pressure. Then, the hydraulic pressure thus generated is controlled by feedback of the steering torque inputted from the steering wheel, thereby generating a steering assist force. In the conventional technology, the steering torque is detected from the value of a torque sensor, and in order to generate the steering assist force corresponding to the torque, pressure supplied to the hydraulic cylinder is controlled. In the conventional technology, regardless of the steering state, the electric motor is always controlled so that the motor torque will become proportional to a motor current command.

In JP-A-2003-212141 (pp. 2 to 5, FIG. 1), a power steering system is disclosed which includes the following configuration components: A steering axis interconnected to a steering mechanism, a hydraulic power cylinder for assisting a steering force to the steering mechanism, a reversible pump equipped with a pair of ejection apertures for supplying a hydraulic pressure to both-sides hydraulic chambers of the hydraulic power cylinder via a first channel and a second channel, an electric motor for driving the reversible pump to perform a normal/reverse rotation driving, a steering-direction detection device for detecting rotation direction of the steering axis, a steering-force detection device for detecting the steering force applied to the steering axis, an electric-motor control device for calculating a driving current outputted to the electric motor in order to drive the hydraulic power cylinder to generate a desired hydraulic pressure on the basis of a steering-force signal detected by the steering-force detection device and a steering-axis rotation-direction signal detected by the steering-direction detection device, a temperature measurement device for measuring temperature of the electric motor and/or an electric-motor driving rotation element, and an overheat protection device for lowering upper-limit value of a driving current outputted from the electric-motor control device by a temperature rise in the electric motor and/or the electric-motor driving rotation element measured by the temperature measurement device. In this power steering system, there are further provided a returning detection device for detecting return of the steering axis, and an overheat-protection release device which, when the returning of the steering axis has been detected by the returning detection device, allows temporary output of a driving current that exceeds the upper-limit value of the driving current lowered by the overheat protection device.

Also, an electric power steering system for assisting the steering with the use of an electric motor alone, i.e., without the use of the hydraulic mechanism, starts to prevail in its main use among small-sized cars. In this technology, at a steering-switching time from a steering operation to a holding operation, or from the holding operation to the steering operation, an assist force of the electric motor is adjusted. For example, in JP-A-8-295257 (pp. 2 to 5, FIG. 2), an electric power steering system is disclosed which includes the following configuration components: A vehicle-velocity detection device for detecting vehicle velocity, a steering-torque detection device for detecting steering torque of a steering wheel, an electric motor for assisting a steering force of the steering wheel, a control device for controlling the electric motor in correspondence with the detected vehicle velocity and the detected steering torque, a steering-change detection device for detecting the switching between the steering operation state where the steering wheel has a steering velocity and the holding operation state where the steering velocity is equal to zero, and an increase/decrease device for performing a current decrease down to a predetermined value with respect to the electric motor if the switching from the steering operation state to the holding operation state has been detected in a state where the detected vehicle velocity is lower than a set vehicle velocity, and for performing in a retarded manner a current increase up to a steering operation value with respect to the electric motor if the switching from the holding operation state to the steering operation state has been detected.

BRIEF SUMMARY OF THE INVENTION

In the above-described conventional technologies, such as will be described below, sufficient consideration has been not necessarily given to an electric-motor control method which makes it possible to simultaneously implement both an enhancement in the steering assist force and a suppression in the steering-wheel micro vibration.

In general, when applying the power steering system to a heavy-weight vehicle, or when implementing a quick steering response, a large steering assist force becomes necessary. Generating the large steering assist force, however, makes it likely that a vibration system determined by appliances (electric motor, hydraulic pipe, hydrauric oil, and the like) configuring the power steering system will be excitedly-vibrated. This may cause a undesired shimmy or vibration on the steering-wheel.

Concretely, when steering (i.e., turning) the steering wheel into a direction moving away from the neutral angle position (i.e., vehicle's straight-ahead driving state), or, conversely, when steering (i.e., returning) the steering wheel into a direction moving toward the neutral angle position, if the steering assist force is lacking, the steering feel becomes heavy and stiff. Accordingly, it becomes necessary to make the steering assist force large. Meanwhile, when holding the steering wheel, in the conventional technologies, the large steering assist force makes the power steering vibration system unstable for a torque external-disturbance. This instability has resulted in a possibility that the shimmy or vibration will occur in the steering wheel.

Also, in the above-described conventional technologies, the judgment on the holding operation/steering operation is made and detected using a pulse which will occur at the time of the steering operation. As a result, when causing the steering wheel to be rotated at a very show velocity, the judgment result turns out to be the steering operation. Actually, however, if the velocity control is performed when rotating the steering wheel at the very show velocity, there has existed a tendency that the self-excited vibration of the steering wheel is likely to manifest itself.

It is an object of the present invention to provide an electric power steering system for controlling an electric motor which exhibits an effect on the enhancement in the steering assist force and the suppression in the micro vibration of the steering wheel, and which exhibits an effect particularly on the suppression in the micro vibration at a very show velocity.

In order to accomplish the above-described object, the present invention provides of a power steering system which includes an electric motor for generating a steering force in response to an command value, and a controller for generating said command value to said electric motor, wherein said controller generates said command value in correspondence with steering state of wheels, and thereby controls torque or rotation number of said electric motor.

According to an embodiment of the invention, when holding the steering wheel, it is required to stop the motion of a piston inside the power cylinder for generating the steering force, and thereby to keep constant the pressure inside the power cylinder whose volume has become fixed. In the reversible pump, the pressure is kept constant by taking advantage of the fact that activation-oil ejection amount and activation-oil leakage amount (i.e., return amount) are balanced. Accordingly, the pump axis is required to rotate at a constant rate. Here, since the reversible pump is driven by the electric motor, it is required to keep rotation of the electric motor at the constant rate.

In view of this situation, there is provided a device which, using a device for detecting steering state of wheels, makes a judgment on the steering state of the wheels between a steering operation state where wheel steering signal is larger than a specific value and a holding operation state where the wheel steering signal is smaller than the specific value. At the time of the steering operation state, the control is executed so that a difference between torque command value to the electric motor and actual torque thereof will become smaller. Also, at the time of the holding operation state, the control is executed so that a difference between rotational velocity of the electric motor and rotational velocity command value thereto will become smaller.

In the judgment on the steering state of the wheels, detecting the steering velocity is preferable. Otherwise, an electric motor for generating a steering reaction force of the wheels is provided on the steering shaft, and a rotation sensor set on the electric motor is used.

Concretely, the present invention provides a power steering system including an electric motor for generating steering force of wheels in correspondence with steering state, and a controller for creating an command value to the electric motor, wherein, using a device for detecting the steering state of the wheels, when wheel steering velocity is larger than a predetermined value, the control is executed so that a difference between torque command value to the electric motor and actual torque thereof will become smaller, and, when the wheel steering velocity is smaller than the predetermined value, the control is executed so that a difference between rotational velocity of the electric motor and rotational velocity command value thereto will become smaller.

Also, the present invention provides a power steering system including a steering-state detection device for detecting steering state of wheels, an electric motor for generating steering force of the wheels, and a controller for providing a steering command signal to the electric motor, wherein the controller inputs the steering state to calculate wheel steering velocity, the steering state being detected by the steering-state detection device, and, depending on magnitude of the wheel steering velocity, creates, as the steering command signal, a torque control signal or a rotational velocity signal for the electric motor, a torque control or a rotational velocity control being executed over the electric motor based on the steering command signal.

Also, the present invention provides a power steering system including a steering-state detection device for detecting steering state of wheels, an electric motor for generating steering force of the wheels, and a controller for providing a steering command signal to the electric motor, wherein the controller inputs the steering state to create the steering command signal, the steering state being detected by the steering-state detection device, the steering command signal belonging to either a holding operation area or a steering operation area in correspondence with one and the same criterion to be applied to both a very slow velocity and a high velocity, a torque control being executed over the electric motor based on the steering command signal if the signal belongs to the steering operation area, a rotational velocity control being executed thereover based thereon if the signal belongs to the holding operation area.

Also, the present invention provides a power steering system including a steering-state detection device for detecting steering state of wheels, an electric motor for generating steering force of the wheels, and a controller for providing a steering command value to the electric motor, wherein the controller inputs the steering state detected by the steering-state detection device, differentiates the steering state thereby to determine a differentiated value of the steering angle, makes a comparison between the differentiated value and a threshold value thereby to judge whether the steering state is in a holding operation state or a steering operation state, and creates a steering command signal of the holding operation if the steering state is in the holding operation state, and creates a steering command signal of the steering operation if the steering state is in the steering operation state, a holding-operation control or a steering-operation control being executed over the electric motor based on the steering command signal.

According to the present invention, there is provided the device which, using the device for detecting the steering state of the wheels, makes the judgment on the steering state of the wheels between the steering operation state where magnitude of the wheel steering signal is larger than a predetermined value and the holding operation state where magnitude of the wheel steering signal is smaller than the predetermined value. At the time of the steering operation state, the control is executed so that the difference between the torque command value to the electric motor and the actual torque thereof will become smaller. Also, at the time of the holding operation state, the control is executed so that the difference between the rotational velocity of the electric motor and the rotational velocity command value thereto will become smaller. As a consequence of this control, it becomes possible to suppress the micro vibration of the steering wheel. In particular, at a very slow velocity as well, it becomes possible to suppress the micro vibration of the steering wheel without adding a specific method.

Other objects, features and advantages of the invention will become apparent from the following description of the embodiments of the invention taken in conjunction with the accompanying drawings.

DETAILED DESCRIPTION OF THE INVENTION

Figure 1:
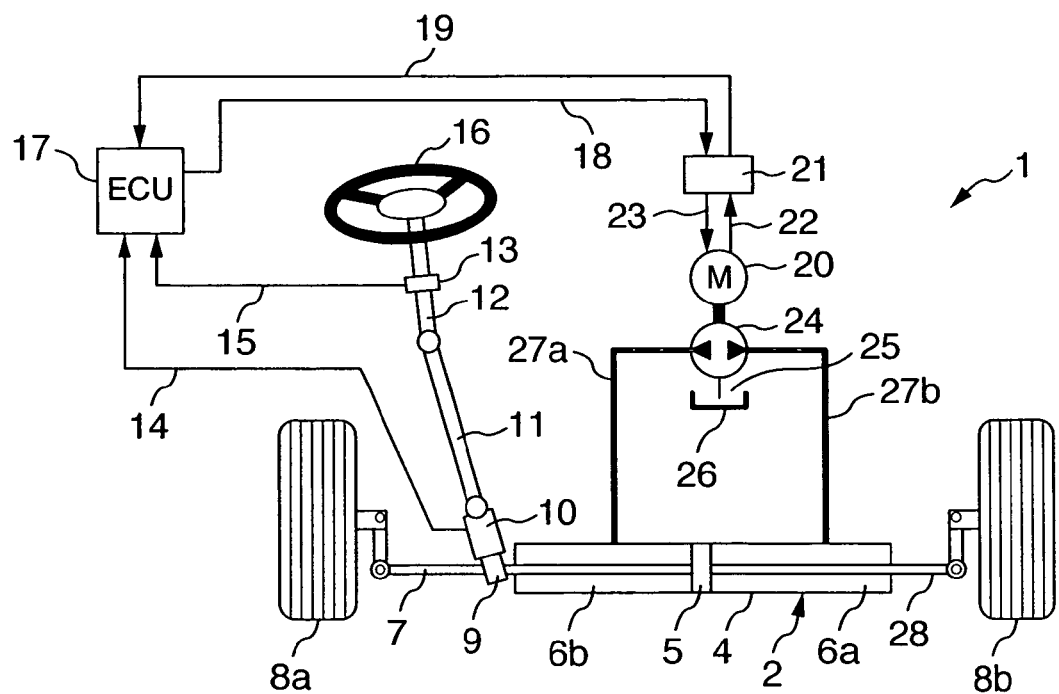
FIG. 1 is an entire diagram of a power steering system in a first embodiment according to the present invention.

As the present embodiment, a power steering system is configured which includes a hydraulic mechanism for generating steering force of wheels in correspondence with steering state, a pump for driving the hydraulic mechanism, an electric motor for driving the pump, and a controller for creating an command value to the electric motor, wherein there is provided a device which, using a device for detecting the steering state of the wheels, makes a judgment on the steering state of the wheels between a steering operation state where wheel steering velocity is larger than a predetermined value and a holding operation state where the wheel steering velocity is smaller than the predetermined value. At the time of the steering operation state, the control is executed so that a difference between torque command value to the electric motor and actual torque thereof will become smaller. Also, at the time of the holding operation state, the control is executed so that a difference between rotational velocity of the electric motor and rotational velocity command value thereto will become smaller.

Also, as the present embodiment, a power steering system is configured which includes a steering-state detection device for detecting steering state of wheels, an electric motor for generating steering force of the wheels, and a controller for providing a steering command value to the electric motor, wherein the controller inputs the steering state detected by the steering-state detection device, differentiates the steering state thereby to determine a velocity value, and creates a steering command signal which belongs to either a holding operation area or a steering operation area in correspondence with magnitude of the velocity value relative to a threshold value which is set in common to both a very slow velocity and a high velocity, a torque control being executed over the electric motor based on the steering command signal if the signal belongs to the steering operation area, a rotational velocity control being executed thereover based thereon if the signal belongs to the holding operation area.

As the device for making the judgment on the steering state of the wheels, the wheel steering velocity is detected.

An electric motor for generating a steering reaction force of the wheels is provided on the steering shaft. Then, a rotation sensor set on the electric motor for generating the steering reaction force of the wheels is used as the device for making the judgment on the steering state of the wheels.

Embodiment 1

Referring to FIG. 1 to FIG. 8, the explanation will be given below concerning embodiments of the present invention. A power steering system 1 detects input of a steering torque from the driver. Then, a power steering control unit (i.e., controller, ECU) 17 calculates an assist-force command value which becomes a steering command signal. Moreover, the control unit drives an electric motor 20, thereby steering wheels 8a and 8b.

A steering input device includes a steering wheel 16, a steering shaft 12 and an output axis 11 coupled to the steering wheel for transmitting the steering torque therefrom, a steering-angle sensor 13 provided on the steering shaft 12, a pinion 9 provided on the output axis 11 and a steering-torque sensor 10 for detecting the steering torque, and a rack 7 engaged with the pinion 9.

A hydraulic power cylinder 2 for generating the assist force is configured such that a piston rod 28 connected to the rack 7 passes through inside a cylinder 4 extendedly provided in a vehicle-body width direction. A piston 5 slidingly moving inside the cylinder 4 is fixed to the piston rod 28. Inside the cylinder 4, the piston 5 forms hydraulic chambers 6, i.e., a right hydraulic chamber 6b and a left hydraulic chamber 6a. The wheel 8a is connectedly contacted with an end portion of the piston rod 28 via the rack 7, and the wheel 8b is connected with an end portion of the piston rod 28 via a link connection.

A reversible pump (pump) 24 for driving the hydraulic mechanism is driven by the electric motor 20. Hydraulic pipes 27a and 27b are connected to the reversible pump 24 which generates the hydraulic pressure and is capable of a forward/reverse rotation. The pipes 27a and 27b are further connected to the hydraulic chambers 6 (6a, 6b), respectively. Also, an oil tank 26 for storing hydrauric oil is connected to the reversible pump 24 via a supply channel 25. This oil tank 26 is configured to be able to collect the hydrauric oil which leaks from the reversible pump 24. Here, rotation axis of the reversible pump 24 is coupled to the electric motor 20, and the electric motor 20 rotates by receiving an command current from a motor driver 21. This allows the reversible pump 24 to be driven in the forward/reverse-rotation capable manner.

The power steering control unit 17 is connected to the steering-torque sensor 10 via a steering-torque signal line 14, the steering-angle sensor 13 via a steering-angle signal line 15, and the motor driver 21 via an command-value signal line 18 and a motor rotational velocity signal line 19, respectively. In the power steering control unit 17, the judgment on the steering-operation/holding-operation is made based on the steering-angle information which corresponds to the steering state of the wheels, thereby switching control over the electric motor 20. Moreover, an command value to the electric motor 20 is calculated based on the steering torque that the driver inputs by operating the steering wheel 16. Furthermore, the command value thus created is transmitted to the motor driver 21 via the command-value signal line 18, then being further inputted into the electric motor 20 via a driver output cable 23. The detailed explanation of these processes will be given later by using FIG. 2 to FIG. 8.

Figure 2:
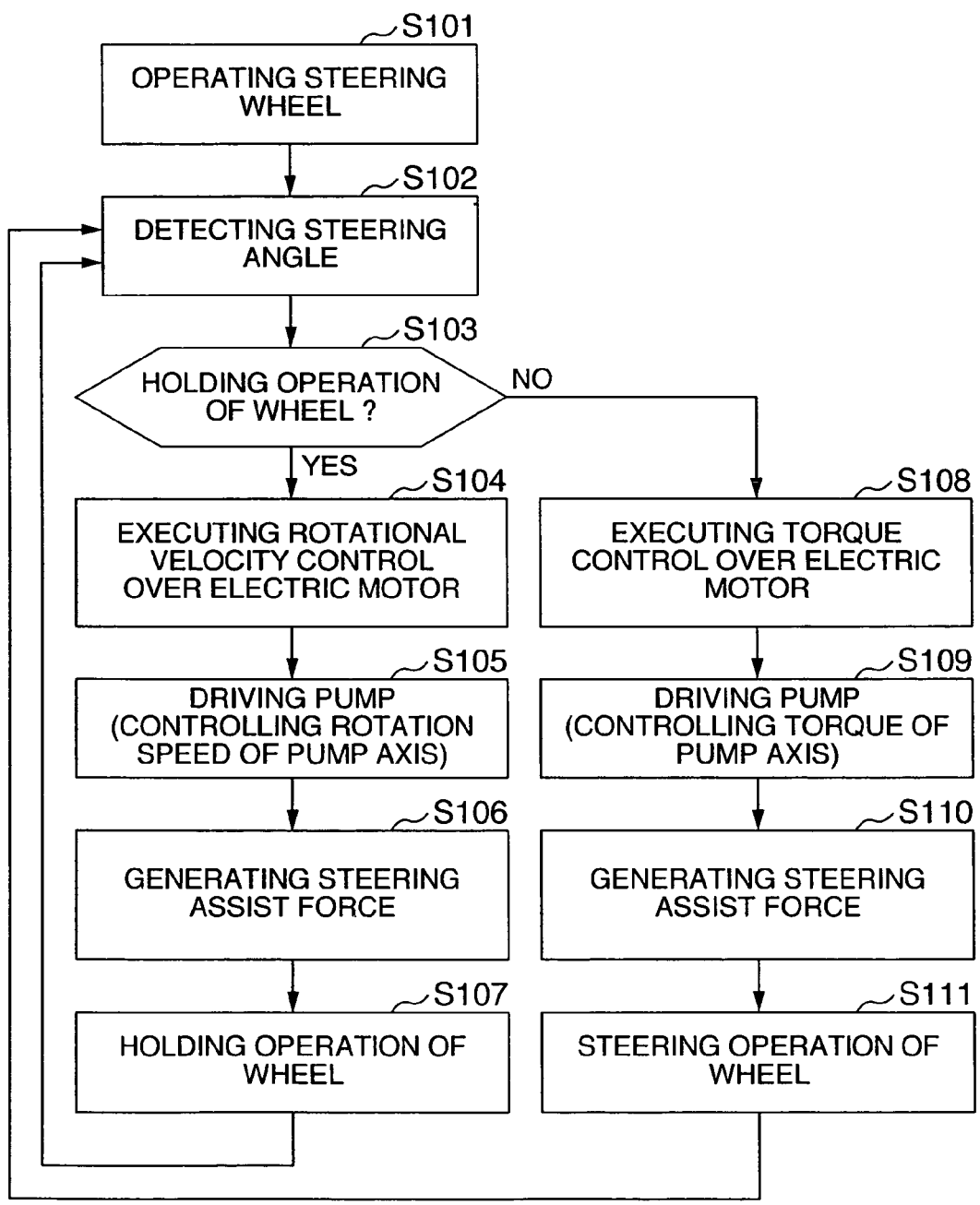
FIG. 2 is a block diagram for illustrating a flow of motor control at the time of wheels' steering-operation/holding-operation according to the present invention.

Next, referring to FIG. 2, the explanation will be given below concerning outline of an electric-motor control flow which corresponds to the wheels' steering-operation/holding-operation in the present embodiment. If, at a step S101, the driver operates the steering wheel 16, the steering-angle sensor 13 detects the steering angle (step S102). At a step S103, the judgment on the wheels' steering-operation/holding-operation is made using a method which will be explained later in FIG. 3 and FIG. 4. First, if the wheel steering state has been judged to be the wheel holding operation, the control proceeds to a step S104. At this step, the holding operation control is executed so that rotational velocity of the electric motor 20 becomes equal to an command velocity. Namely, the rotational velocity control will be executed over the electric motor 20. By the motor over which the rotational velocity control has been executed, the rotation axis of the reversible pump 24 is driven at a constant rotation at a step S105. This generates a steering assist force (step S106), thereby allowing the holding operation of the wheels 8a and 8b (step S107).

Meanwhile, if the wheel steering state has been judged to be the wheel steering operation, the control proceeds to a step S108. At this step, the steering operation control is executed so that output torque of the electric motor 20 becomes proportional to an command current. Namely, the torque control will be executed over the electric motor 20. By the motor over which the torque control has been executed, the reversible pump 24 is driven at a step S109. This generates a steering assist force (step S110), thereby allowing the steering operation of the wheels 8a and 8b (step S111).

Figure 3:
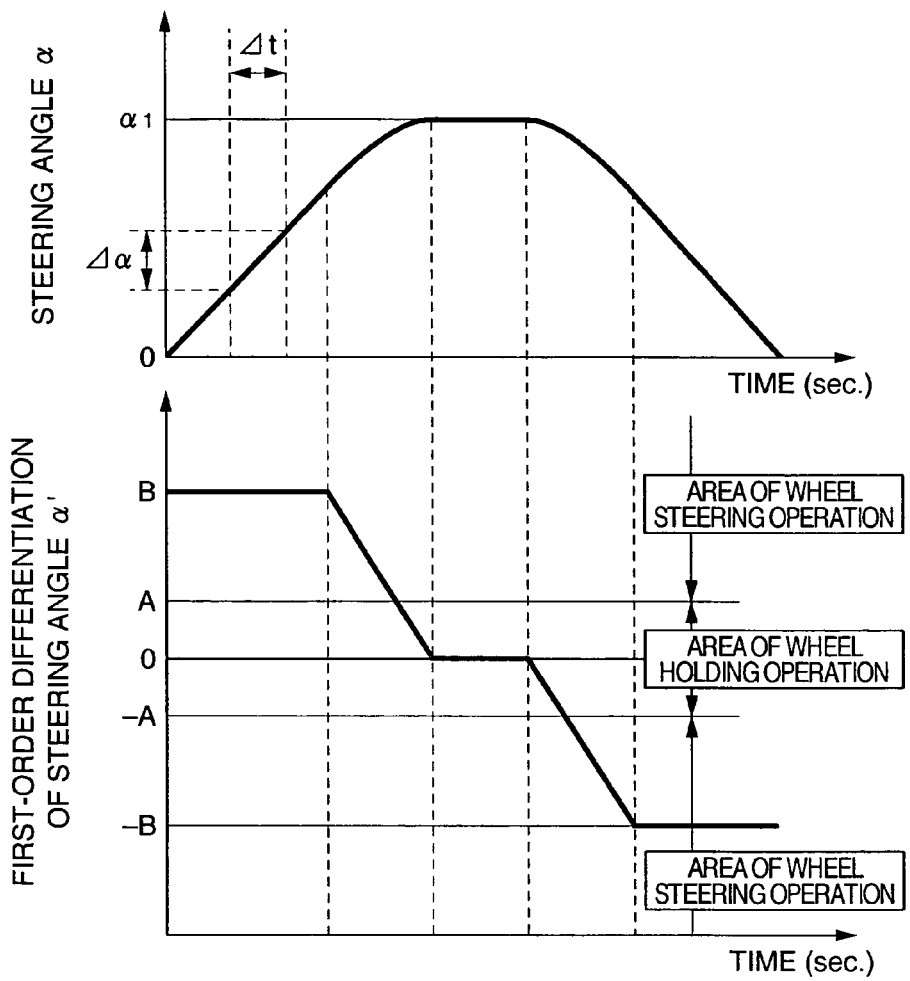
FIG. 3 is a diagram for illustrating a judgment method at the time of the wheels' steering-operation/holding-operation according to the present invention.
Figure 4:
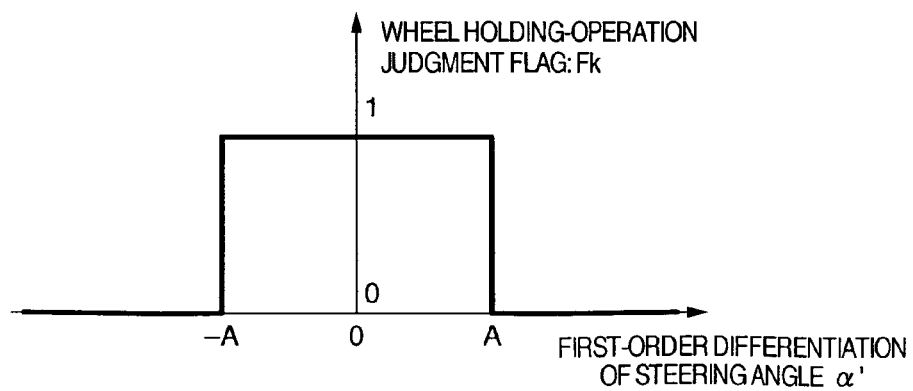
FIG. 4 is a diagram for illustrating setting of a judgment flag at the judgment time of the wheels' steering-operation/holding-operation according to the present invention.

Next, referring to FIG. 3 and FIG. 4, the explanation will be given below regarding a judgment method for judging the wheels' steering-operation/holding-operation. FIG. 3 schematically illustrates time variation in the steering angle and time variation in first-order differentiation of the steering angle. The steering condition here is as follows: Namely, the steering wheel is turned from the neutral position (i.e., vehicle's straight-ahead running state) to a steering angle $\alpha_1$ at a constant steering velocity. After that, the steering wheel is returned to the neutral position at the constant steering velocity. At this time, the first-order differentiation $\alpha'$ of the steering angle can be determined by the following expression:

$$\alpha' = \Delta\alpha/\Delta t \quad (1)$$

In the case of FIG. 3, when the steering wheel is turned from the neutral position (i.e., vehicle's straight-ahead driving state) at the constant steering velocity, $\alpha'$ becomes equal to the constant value B. When the steering wheel is returned, $\alpha'$ becomes equal to the constant value −B. Also, at the time of the holding operation, $\alpha'$ becomes equal to zero, i.e., $\alpha'=0$. When the steering operation is transitioned to the holding operation, $\alpha'$ becomes equal to values which are acquired by the interpolation between B and 0. Accordingly, as illustrated in the drawing, setting threshold values±A makes it possible to divide the area of the wheels' steering-operation/holding-operation. Setting the threshold values±A in this way turns out to execute the rotational velocity control over the electric motor 20 even when the steering wheel 16 is rotated at the very show velocity. Also, for practical convenience of the electric-motor control, it is preferable to use a wheel holding-operation judgment flag Fk as is illustrated in FIG. 4. The flag Fk is set such that the flag Fk becomes equal to 1 when the first-order differentiation $\alpha'$ of the steering angle assumes a value indicated by the following expression:

$$-A \leq \alpha' \leq A \quad (2)$$

Figure 5:
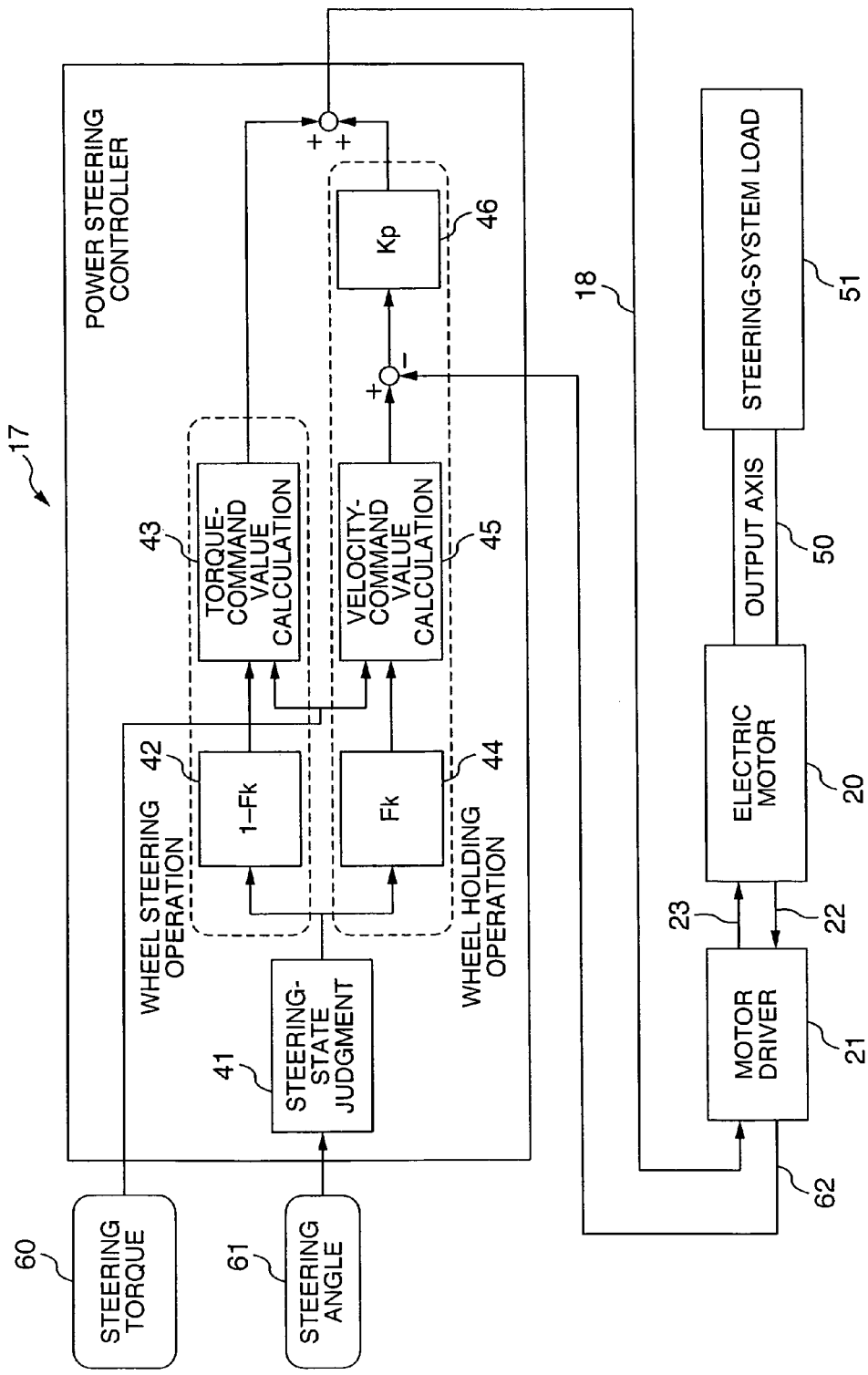
FIG. 5 is a flowchart diagram for illustrating creation flow of a motor command value inside a power steering control unit according to the present invention.

Next, referring to FIG. 5, the explanation will be given below concerning an embodiment of the creation method for creating an command value to the electric motor 20 in the power steering controller 17. In the power steering controller 17, a steering-angle signal 61 is inputted into a steering-state judgment block 41, where the holding-operation judgment flag Fk is calculated. For example, if the wheel steering state has been judged to be a wheel steering operation, the value of a steering-operation flag 42 becomes 1−Fk=1 because of Fk=0. As a result, a torque command control will be selected. Based on map information prepared in advance and illustrated schematically in FIG. 7, a torque-command-value calculation block 43 calculates a torque command value by using a steering-torque signal 60. The torque command value thus calculated is inputted into the motor driver 21 via the command-value signal line 18. In the motor driver 21, a control system which will be explained later in FIG. 6 executes the torque control, using an armature current detected via a motor rotation velocity/armature current signal line 22. A steering-system load 51 such as the reversible pump is coupled to output axis 50 of the electric motor, and is driven by the electric motor. Meanwhile, if the wheel steering state has been judged to be a wheel holding operation, the value of a holding-operation flag 44 becomes 1 because of Fk=1. As a result, a rotational velocity control will be selected. Based on map information prepared in advance and illustrated schematically in FIG. 8, a velocity-command-value calculation block 45 calculates a rotational velocity command value by using the steering-torque signal 60. A deviation between the rotational velocity command value and a motor rotational velocity detected via a motor rotational velocity signal line 62 is calculated in a proportion gain 46, then being inputted into the motor driver 21 via the command-value signal line 18. In the motor driver 21, the rotational velocity control is executed.

Figure 6:
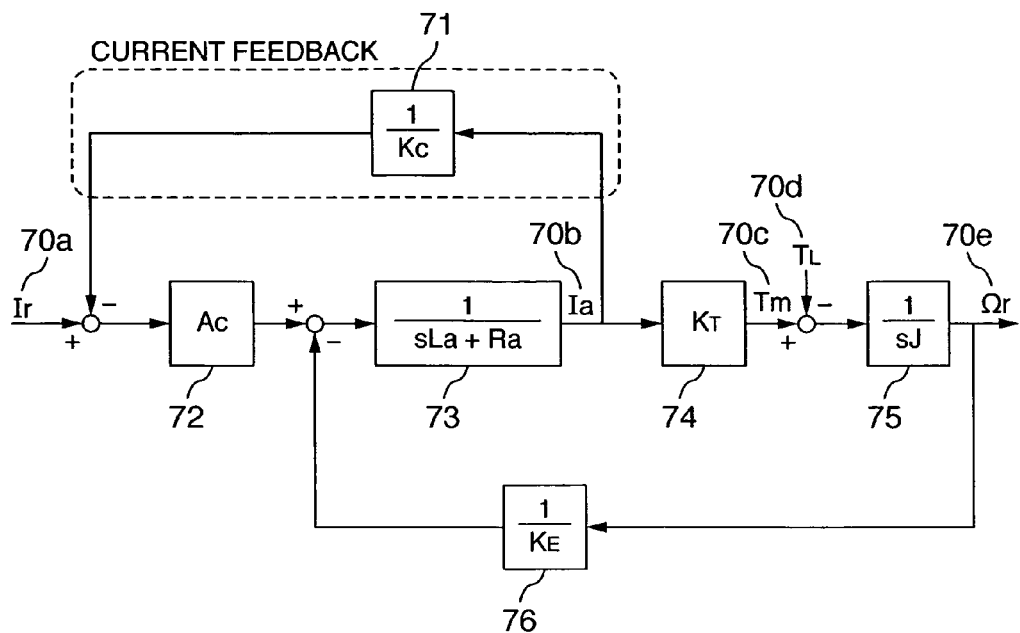
FIG. 6 is a diagram for illustrating a motor driver and an electric motor according to the present invention with a block-line diagram.
Figure 7:
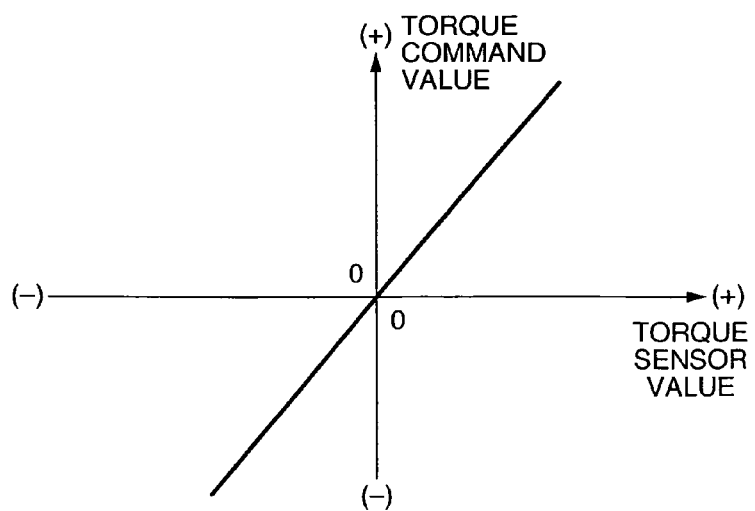
FIG. 7 is a diagram for illustrating an example of creation map of a torque command value according to the present invention.
Figure 8:
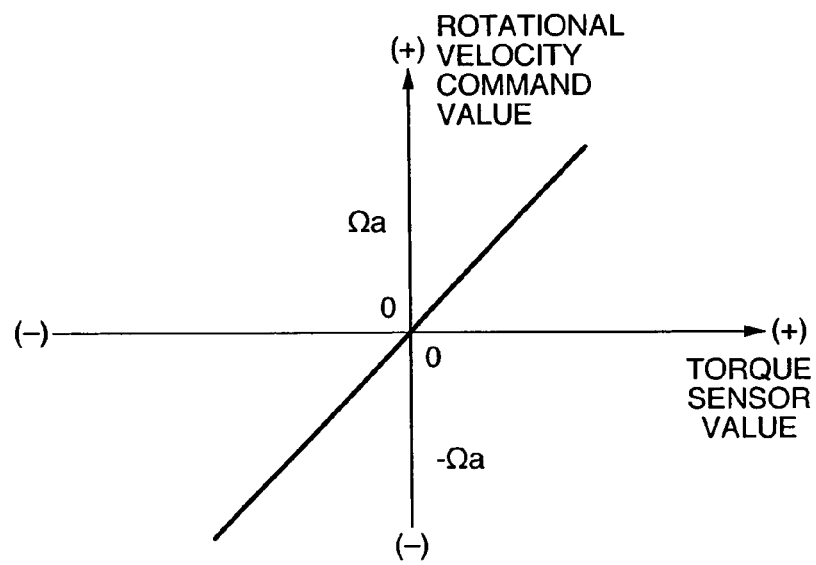
FIG. 8 is a diagram for illustrating an example of creation map of a rotational velocity command value according to the present invention.

Next, referring to FIG. 6, the explanation will be given below regarding the principle of the torque control executed in the motor driver 21. FIG. 6 illustrates a general control block-line diagram of the electric motor 20 and the motor driver 21 (Refer to, e.g., Hiroshi Ogino, "How to Use Brushless DC Motor", Ohmsha, pp. 16-17).

In FIG. 6, the respective reference notations denote the following contents:

| | |
|---|---|
| Ac: | current amplifier |
| La: | armature inductance |
| Ra: | armature resistance |
| KT: | torque constant |
| J: | motor-axis inertia |
| 1/Kc: | current detector |
| KE: | induced-voltage constant |
| Also, 1/s denotes integration operation. | |

A difference between a current command value 70a and an armature current 70b from the current feedback loop is inputted into a current amplifier 72. Then, an induced voltage which is proportional to rotational velocity 70e of the motor axis is determined by an induced-voltage constant block 76. Moreover, a difference between the current command value and the induced voltage is inputted into an armature resistance/inductance characteristics block 73. This creates the armature current 70b, and allows a torque constant block 74 to determine a torque 70c which the electric motor 20 will generate. Furthermore, in a motor-axis inertia block 75, the motor-axis rotational velocity 70e is determined based on a difference between the torque 70c and an external-disturbance torque 70d. In the configuration as described above, by making the value of the current amplifier 72 exceedingly large, it becomes possible to flow the armature current 70b which is proportional to the current command value 70a. Consequently, it turns out that the torque 70c also becomes proportional to the current command value 70a. This allows the torque control to be executed.

Consider the case where the power steering system 1 of the present embodiment is used which is configured as described above. First, at the time of the steering operation, the torque control is executed over the electric motor 20, thereby driving the reversible pump 24. Meanwhile, at the time of the holding operation, the steering wheel 16 is rotating at a very show velocity, or is in a stopping state. At this time, the rack 7 is also moving at a very show velocity, or is in a stopping state. In the states like this, the reversible pump 24 hardly needs to eject the hydrauric oil, but simultaneously needs to keep the ejection pressure constant. Namely, it is advisable to rotate the axis of the reversible pump 24 at a very slow velocity and at a constant rate. Now, in this case, the rotational velocity control is executed over the electric motor 20. This drives the reversible pump 24 at the constant rotation. Namely, the ejection pressure of the reversible pump 24 is kept constant, which suppresses the self-excited vibration of the steering wheel 16.

Although, in the present embodiment, the power steering controller 17 and the motor driver 21 are formed in a separate manner, these units may also be formed in an integrated manner. In this integrated case, downsizing the system becomes implementable. This allows an enhancement in the on-board property onto the vehicle. Also, in substitution for the steering-angle sensor 13 for judging the steering state, a sensor may also be used which, for example, is designed for detecting stroke of the piston rod 28. This is effective if there exists no enough available space in proximity to the steering wheel 16.

The power steering system of the present embodiment includes the electric motor 20 for generating the steering force of the wheels in correspondence with the driver or the steering state of the controller, and the controller 17 for creating the command value to the electric motor 20, wherein, using the device for detecting the wheel steering state of the wheels 8a and 8b, when the wheel steering velocity is larger than a predetermined value, i.e., a threshold value, the control is executed so that a difference between the torque command value to the electric motor and the actual torque thereof will become smaller, and, when the wheel steering velocity is smaller than the predetermined value, the control is executed so that a difference between the rotational velocity of the electric motor 20 and the rotational velocity command value thereto will become smaller.

Also, the power steering system of the present embodiment includes the hydraulic mechanism for generating the steering force of the wheels in correspondence with the driver or the steering state of the controller, the pump for driving the hydraulic mechanism, the electric motor for driving the pump, and the controller for creating the command value to the electric motor, wherein there is provided the device which, using the device for detecting the steering state of the wheels, makes the judgment on the steering state of the wheels between the steering operation state where the wheel steering velocity is larger than a predetermined value and the holding operation state where the wheel steering velocity is smaller than the predetermined value. At the time of the steering operation state, the control is executed so that a difference between the torque command value to the electric motor and the actual torque thereof will become smaller. Also, at the time of the holding operation state, the control is executed so that a difference between the rotational velocity of the electric motor and the rotational velocity command value thereto will become smaller.

As the device for making the judgment on the steering state of the wheels 8a and 8b, detecting the wheel steering velocity is also preferable.

The electric motor 20 for generating a steering reaction force of the wheels 8a and 8b is provided on the steering shaft. Then, a rotation sensor set on the electric motor for generating the steering reaction force of the wheels is used as the device for making the judgment on the steering state of the wheels 8a and 8b.

The controller provided in the power steering system inputs the steering state to calculate the wheel steering velocity, the steering state being detected by the steering-state detection device, and, depending on magnitude of the wheel steering velocity, creates, as the steering command signal, the torque control signal or the rotational velocity signal for the electric motor, the torque control or the rotational velocity control being executed over the electric motor based on the steering command signal.

Also, the controller inputs the steering state to create the steering command signal, the steering state being detected by the steering-state detection device, the steering command signal belonging to either the holding operation area or the steering operation area in correspondence with one and the same criterion to be applied to both the very slow velocity and the high velocity, the torque control being executed over the electric motor based on the steering command signal if the signal belongs to the steering operation area, the rotational velocity control being executed thereover based thereon if the signal belongs to the holding operation area.

Also, the controller inputs the steering state detected by the steering-state detection device, differentiates the steering state thereby to determine the differentiated value, makes the comparison between the differentiated value and the threshold value thereby to judge whether the steering state is in the holding operation state or the steering operation state, and creates the steering command signal of the holding operation if the steering state is in the holding operation state, and creates the steering command signal of the steering operation if the steering state is in the steering operation state, the holding-operation control or the steering-operation control being executed over the electric motor based on the steering command signal.

Also, the controller inputs the steering state detected by the steering-state detection device, differentiates the steering state thereby to determine the velocity value, and creates the steering command signal which belongs to either the holding operation area or the steering operation area in correspondence with magnitude of the velocity value relative to the threshold value set in common to both the very slow velocity and the high velocity, the torque control being executed over the electric motor based on the steering command signal if the signal belongs to the steering operation area, the rotational velocity control being executed thereover based thereon if the signal belongs to the holding operation area.

Necessary confirmation steps for confirming that the present embodiment has been carried out are as follows: Namely, the coupling between the motor driver 21 and the motor rotational velocity signal line 19 is released. Then, instead of a motor rotation-number signal from the motor driver 21, a constant voltage is applied, for example. In this case, by monitoring the command value via the command-value signal line 18, confirming the following condition is preferable: In the steering operation state, the command value does not change even if the applied voltage is increased; whereas, in the holding operation state, the command value increases in accompaniment with the increase in the applied voltage. Also, by measuring rotation velocities of the electric motor 20 at the times of the steering operation and holding operation, confirming the following condition is preferable: At the steering operation time, there occurs a variation in the motor rotation velocity; whereas, at the holding operation time, the motor rotational velocity is constant.

Embodiment 2

Figure 9:
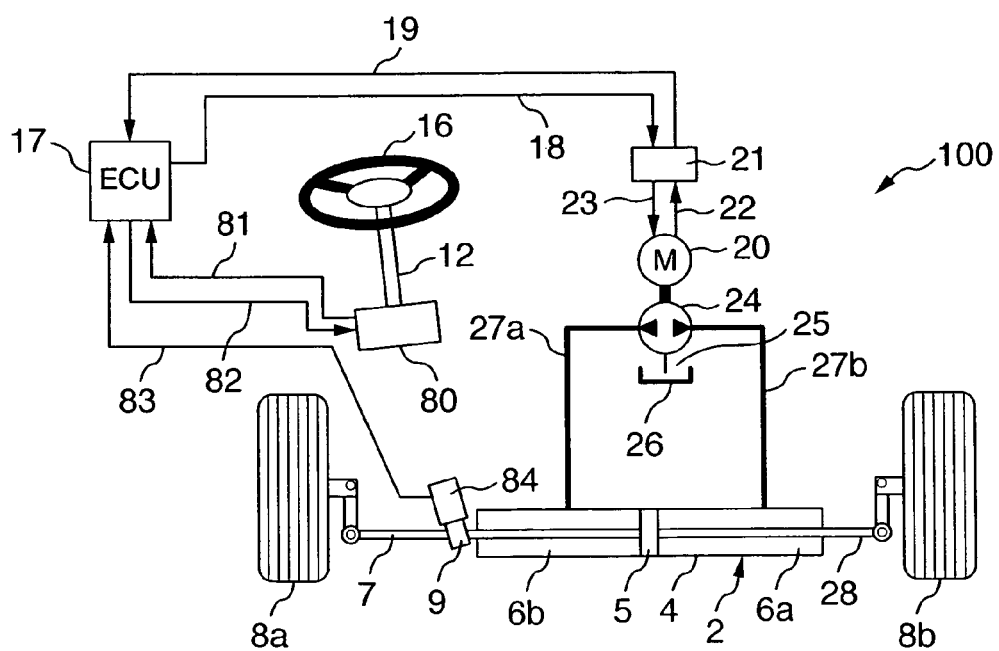
FIG. 9 is an entire diagram of a power steering system in a second embodiment according to the present invention.

Next, referring to FIG. 9, the explanation will be given below concerning another embodiment of the present invention. With respect to the same configurations as the ones in the first embodiment, the explanations therefor will be given in an assisted manner. Hereinafter, this explanation manner remains the same.

In a power steering system 100, the steering input device includes the steering wheel 16, the steering shaft 12 engagedly coupled to the steering wheel for transmitting the steering torque therefrom, and a steering reaction force generating motor 80.

In substitution for the steering-angle sensor 13 and the steering-torque sensor 10 in the first embodiment, the power steering control unit 17 detects a steering angle from the steering reaction force generating motor 80 via a steering-angle signal line 81, and detects the steering torque from a steering-torque sensor 84 via a steering-torque signal line 83. This allows the control unit 17 to configure a rotation sensor, and to calculate a steering command value to the electric motor 20. The point in which the present embodiment differs from the first embodiment is as follows: Namely, the steering force inputted from the steering wheel 16 is not directly transmitted to the pinion 9, but is produced by a steer-by-wire system which is mechanically isolated therefrom. In the steer-by-wire system, there exists a necessity for generating a steering reaction force from the wheels 8*a* and 8*b*. Consequently, the steer-by-wire system is configured such that the power steering control unit 17 creates a steering reaction force command value, and inputs the reaction force command value into the steering reaction force generating motor 80 via a reaction force command value signal line 82. In the present embodiment, an external vibrating force from the road surface is not directly transmitted to the steering wheel 16. As a result, the present embodiment is effective in improving the steering feel. Since the other configurations are basically the same as the ones in the first embodiment, the explanation therefor will be omitted.

Embodiment 3

Figure 10:
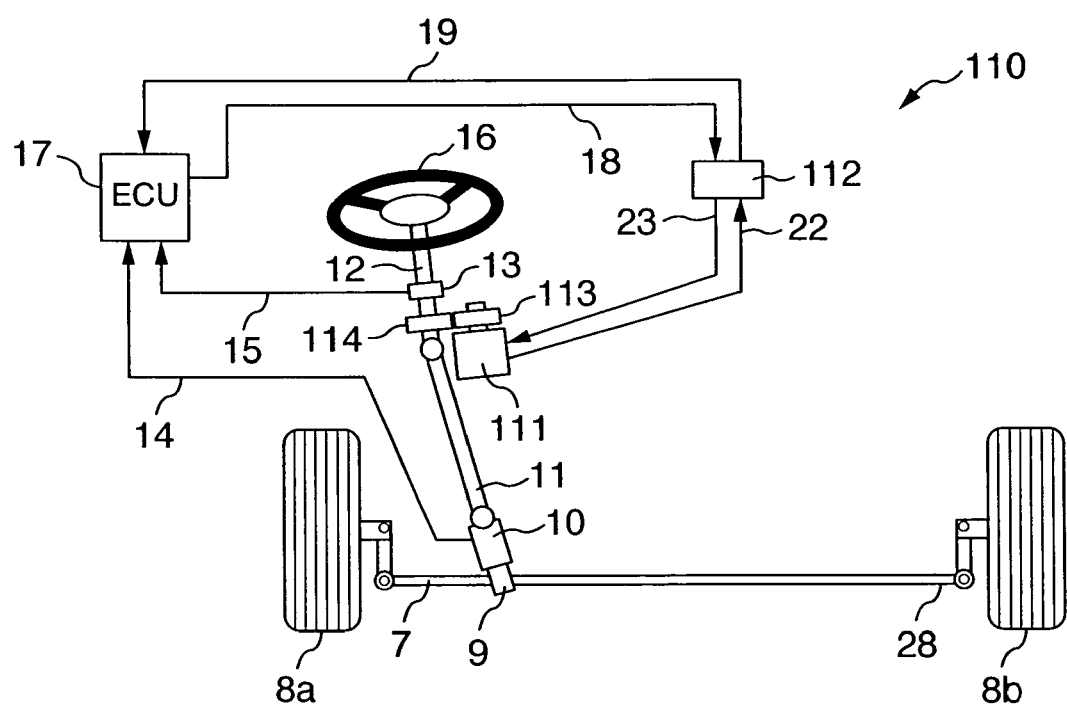
FIG. 10 is an entire diagram of a power steering system in a third embodiment according to the present invention.

Next, referring to FIG. 10, the explanation will be given below regarding still another embodiment of the present invention. In a power steering system 110, an electric motor 111 receives an command from a motor driver 112. This allows the motor 111 to generate a steering assist force via a gear wheel A113 provided on the motor axis, and a gear wheel B114 provided on the steering shaft 12 and engaged with the gear wheel A113.

The characteristic of the present embodiment is as follows: Namely, at the time of the holding operation, the rotational velocity control is executed so that the rotation of the electric motor 111 will stop.

The point in which the present embodiment differs from the first embodiment is as follows: Namely, in the present embodiment, the steering assist force is generated with the use of the electric motor alone, i.e., without the use of the hydraulic mechanism. As a result, the present embodiment necessitates only the small number of configuration components, and is effective in implementation of the cost lowering, space saving, and light-weighting of the system. Since the other configurations are basically the same as the ones in the first embodiment, the explanation therefor will be omitted.

Necessary confirmation steps for confirming that the present embodiment has been carried out are as follows: Namely, the coupling between the motor driver 112 and the motor rotational velocity signal line 19 is released. Then, instead of a motor rotation-number signal from the motor driver 112, a constant voltage is applied, for example. In this case, by monitoring the command value via the command-value signal line 18, confirming the following condition is preferable: In the steering operation state, the command value does not change even if the applied voltage is increased; whereas, in the holding operation state, the command value increases in accompaniment with the increase in the applied voltage. Also, by measuring rotation velocities of the electric motor 111 at the times of the steering operation and holding operation, confirming the following condition is preferable: At the steering operation time, there occurs a variation in the motor rotation velocity; whereas, at the holding operation time, the motor rotational velocity stops.

Summarizing the present embodiment explained so far, the present embodiment is expressed as follows.

As a countermeasure 1, prevention of the self-excited vibration of the steering wheel, as a countermeasure 2, an enhancement in the steering assist force, and, as a countermeasure 3, provision of the power steering system which is made usable in common to both the very slow-velocity time and the high-velocity time. Here, conventionally, the power steering system has been made complicated. This is because the system has been used in a classified manner, depending on whether the case is the very slow-velocity time or the high-velocity time.

On account of this, as the countermeasure therefor, based on the judgment on the holding operation state/steering operation state, the switching between the rotational velocity control and the torque control over the electric motor will be executed.

As the concrete configuration, as the steering-angle signal, the steering state of the steering wheel or the wheels' steering reaction force signal is determined. Moreover, the first-order differentiation of the steering-angle signal is determined, then making the comparison between the velocity value, i.e., the differentiated value, and the threshold value. This process allows the division setting of the holding operation/steering operation area. If the steering state has been judged to be the steering operation, the control will be executed so that the difference between the torque command value and the actual torque thereof will become smaller. Meanwhile, if the steering state has been judged to be the holding operation, the rotational velocity control will be executed.

As described above, the wheel steering velocity can be determined easily and securely by calculating the differentiation of the steering-angle signal. The wheel steering velocity, however, may also be determined in a direct manner. Furthermore, depending on magnitude of the wheel steering velocity, it is judged whether or not the velocity falls in a predetermined range. This process allows the setting of the holding-operation/steering-operation area, thereby executing creation of the command for executing the electric-motor rotational velocity control or torque control. This, eventually, allows the execution of the rotational velocity control or torque control over the electric motor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system comprising:
   an electric motor for generating a steering force in response to a command value, and a controller for generating said command value to said electric motor, wherein said controller generates said command value in correspondence with steering state of wheels, and thereby controls torque or rotation number of said electric motor, and means for detecting said steering state of said wheels, and wherein, based on a detection result by said means for detecting said steering state, if the steering velocity of said wheels is larger than a predetermined value, said controller controls said command value so that a difference between a torque command value, which is said command value to said electric motor, and an actual torque of said electric motor will become smaller, and, if said steering velocity of said wheels is smaller than said predetermined value, said controller controls said command value so that a difference between a rotational velocity command value, which is said command value to said electric motor, and an actual rotational velocity of said electric motor will become smaller, and further comprising:

a second electric motor for providing a steering reaction force to a steering shaft to which said power steering system is connected, and a rotation sensor provided on said second electric motor, wherein said means for detecting said steering state of said wheels detects said steering state based on output of said rotation sensor.

2. A system comprising:

an electric motor for generating a steering force in response to a command value, and a controller for generating said command value to said electric motor, wherein said controller generates said command value in correspondence with steering state of wheels, and thereby controls torque or rotation number of said electric motor, and means for detecting said steering state of said wheels, and wherein, based on a detection result by said means for detecting said steering state, if the steering velocity of said wheels is larger than a predetermined value, said controller controls said command value so that a difference between a torque command value, which is said command value to said electric motor, and an actual torque of said electric motor will become smaller, and, if said steering velocity of said wheels is smaller than said predetermined value, said controller controls said command value so that a difference between a rotational velocity command value, which is said command value to said electric motor, and an actual rotational velocity of said electric motor will become smaller, and wherein said controller inputs said steering state to calculate said wheel steering velocity, said steering state being detected by said steering-state detection means, and, depending on magnitude of said wheel steering velocity, creates, as a steering command signal, a torque control signal or a rotational velocity signal for said electric motor, a torque control or a rotational velocity control being executed over said electric motor based on said steering command signal.

3. A system comprising:

an electric motor for generating a steering force in response to a command value, and a controller for generating said command value to said electric motor, wherein said controller generates said command value in correspondence with steering state of wheels, and thereby controls torque or rotation number of said electric motor, and further comprising:

a hydraulic mechanism for steering said wheels, pump driven by said electric motor and driving said hydraulic mechanism, means for detecting said steering state of said wheels, and means which, based on a detection result by said means for detecting said steering state, makes a judgment as to whether said steering state of said wheels is a steering operation state where steering velocity of said wheels is faster than a predetermined value or a holding operation state where said steering velocity of said wheels is slower than said predetermined value, and wherein, in a case of said steering operation state, said controller controls said command value so that a difference between a torque command value, which is said command value to said electric motor, and an actual torque of said electric motor will become smaller, and, in a case of said holding operation state, said controller controls said command value so that a difference between a rotational velocity command value, which is said command value to said electric motor, and an actual rotational velocity of said electric motor will become smaller, wherein said controller inputs said steering state to calculate said wheel steering velocity, said steering state being detected by said steering-state detection means, and, depending on magnitude of said wheel steering velocity, creates, as a steering command signal, a torque control signal or a rotational velocity signal for said electric motor, a torque control or a rotational velocity control being executed over said electric motor based on said steering command signal.

4. A system comprising:

an electric motor for generating a steering force in response to a command value, and a controller for generating said command value to said electric motor, wherein said controller generates said command value in correspondence with steering state of wheels, and thereby controls torque or rotation number of said electric motor, and means for detecting said steering state of said wheels, and wherein, based on a detection result by said means for detecting said steering state, if the steering velocity of said wheels is larger than a predetermined value, said controller controls said command value so that a difference between a torque command value, which is said command value to said electric motor, and an actual torque of said electric motor will become smaller, and, if said steering velocity of said wheels is smaller than said predetermined value, said controller controls said command value so that a difference between a rotational velocity command value, which is said command value to said electric motor, and an actual rotational velocity of said electric motor will become smaller, and wherein said controller inputs said steering state to create a steering command signal, said steering state being detected by said steering-state detection means, said steering command signal belonging to either a holding operation area or a steering operation area in correspondence with one and the same criterion to be applied to both a low velocity and a high velocity, a torque control being executed over said electric motor based on said steering command signal if said signal belongs to said steering operation area, a rotational velocity control being executed thereover based thereon if said signal belongs to said holding operation area.

5. A system comprising:

an electric motor for generating a steering force in response to a command value, and a controller for generating said command value to said electric motor, wherein said controller generates said command value in correspondence with steering state of wheels, and thereby controls torque or rotation number of said electric motor, and further comprising:

a hydraulic mechanism for steering said wheels, a pump driven by said electric motor and driving said hydraulic mechanism, means for detecting said steering state of said wheels and means which based on a detection result by said means for detecting said steering state, makes a judgment as to whether said steering state of said wheels is a steering operation state where steering velocity of said wheels is faster than a predetermined value or a holding operation state where said steering velocity of said wheels is slower than said predetermined value, and wherein, in a case of said steering operation state, said controller controls said command value so that a difference between a torque command value, which is said command value to said electric motor, and an actual torque of said electric motor will become smaller, and, in a case of said holding operation state, said controller controls said command value so that a difference between a rotational velocity command value, which is said command value to said electric motor, and an actual rotational velocity of said electric motor will become smaller, wherein said controller inputs said steering state to create a steering command signal, said steering state being detected by said steering-state detection means, said steering command signal belonging to either a holding operation area or a steering operation area in correspondence with one and the same criterion to be applied to both a very slow velocity and a high velocity, a torque control being executed over said electric motor based on said steering command signal if said signal belongs to said steering operation area, a rotational velocity control being executed thereover based thereon if said signal belongs to said holding operation area.

6. A system comprising:

an electric motor for generating a steering force in response to a command value, and a controller for generating said command value to said electric motor, wherein said controller generates said command value in correspondence with steering state of wheels, and thereby controls torque or rotation number of said electric motor, and means for detecting said steering state of said wheels, and wherein, based on a detection result by said means for detecting said steering state, if the steering velocity of said wheels is larger than a predetermined value, said controller controls said command value so that a difference between a torque command value, which is said command value to said electric motor, and an actual torque of said electric motor will become smaller, and, if said steering velocity of said wheels is smaller than said predetermined value, said controller controls said command value so that a difference between a rotational velocity command value, which is said command value to said electric motor, and an actual rotational velocity of said electric motor will become smaller, and wherein said controller inputs said steering state detected by said steering-state detection means, differentiates said steering state thereby to determine a differentiated value of the detected steering state, makes a comparison between said differentiated value and a threshold value thereby to make a judgment as to whether said steering state is in a holding operation state or a steering operation state, and creates a steering command signal of said holding operation if said steering state is in said holding operation state, and creates a steering command signal of said steering operation if said steering state is in said steering operation state, a holding-operation control or a steering-operation control being executed over said electric motor based on said steering command signal.

7. A system comprising:

an electric motor for generating a steering force in response to a command value, and a controller for generating said command value to said electric motor, wherein said controller generates said command value in correspondence with steering state of wheels, and thereby controls torque or rotation number of said electric motor, and further comprising:

a hydraulic mechanism for steering said wheels, a pump driven by said electric motor and driving said hydraulic mechanism, means for detecting said steering state of said wheels, and means which, based on a detection result by said means for detecting said steering state, makes a judgment as to whether said steering state of said wheels is a steering operation state where steering velocity of said wheels is faster than a predetermined value or a holding operation state where said steering velocity of said wheels is slower than said predetermined value and wherein, in a case of said steering operation state, said controller controls said command value so that a difference between a torque command value, which is said command value to said electric motor and an actual torque of said electric motor will become smaller, and, in a case of said holding operation state, said controller controls said command value so that a difference between a rotational velocity command value which is said command value to said electric motor and an actual rotational velocity of said electric motor will become smaller, wherein said controller inputs said steering state detected by said steering-state detection means, differentiates said steering state thereby to determine a differentiated value of the detected steering state, makes a comparison between said differentiated value and a threshold value thereby to make a judgment as to whether said steering state is in a holding operation state or a steering operation state, and creates a steering command signal of said holding operation if said steering state is in said holding operation state, and creates a steering command signal of said steering operation if said steering state is in said steering operation state, a holding-operation control or a steering-operation control being executed over said electric motor based on said steering command signal.

8. A system comprising:

an electric motor for generating a steering force in response to a command value, and a controller for generating said command value to said electric motor, wherein said controller generates said command value in correspondence with steering state of wheels, and thereby controls torque or rotation number of said electric motor, and means for detecting said steering state of said wheels, and wherein, based on a detection result by said means for detecting said steering state, if the steering velocity of said wheels is larger than a predetermined value, said controller controls said command value so that a difference between a torque command value, which is said command value to said electric motor, and an actual torque of said electric motor will become smaller, and, if said steering velocity of said wheels is smaller than said predetermined value, said controller controls said command value so that a difference between a rotational velocity command value, which is said command value to said electric motor, and an actual rotational velocity of said electric motor will become smaller, and wherein said controller inputs said steering state detected by said steering-state detection means, differentiates said steering state thereby to determine a velocity value, and creates a steering command signal which belongs to either a holding operation area or a steering operation area in correspondence with magnitude of said velocity value relative to a threshold value which is set in common to both a very slow velocity and a high velocity, a torque control being executed over said electric motor based on said steering command signal if said signal belongs to said steering operation area, a rotational velocity control being executed thereover based thereon if said signal belongs to said holding operation area.

9. A system comprising:

an electric motor for generating a steering force in response to a command value, and a controller for generating said command value to said electric motor, wherein said controller generates said command value in correspondence with steering state of wheels, and thereby controls torque or rotation number of said electric motor, and further comprising:

a hydraulic mechanism for steering said wheels, a pump driven by said electric motor and driving said hydraulic mechanism, means for detecting said steering state of said wheels, and means which, based on a detection result by said means for detecting said steering state, makes a judgment as to whether said steering state of said wheels is a steering operation state where steering velocity of said wheels is faster than a predetermined value or a holding operation state where said steering velocity of said wheels is slower than said predetermined value, and wherein, in a case of said steering operation state, said controller controls said command value so that a difference between a torque command value, which is said command value to said electric motor, and an actual torque of said electric motor will become smaller, and, in a case of said holding operation state, said controller controls said command value so that a difference between a rotational velocity command value, which is said command value to said electric motor, and an actual rotational velocity of said electric motor will become smaller, wherein said controller inputs said steering state detected by said steering-state detection means, differentiates said steering state thereby to determine a velocity value, and creates a steering command signal which belongs to either a holding operation area or a steering operation area in correspondence with magnitude of said velocity value relative to a threshold value which is set in common to both a very slow velocity and a high velocity, a torque control being executed over said electric motor based on said steering command signal if said signal belongs to said steering operation area, a rotational velocity control being executed thereover based thereon if said signal belongs to said holding operation area.

10. A power assisting method of assisting a wheel steering force, by driving a hydraulic pump which uses a hydraulic fluid ejection pressure to generate a hydraulic pressure, and reciprocating a piston inside a power cylinder by the hydraulic pressure so as to generate the wheel steering force, comprising:

judging whether a holding operation state exists where a wheel steering velocity of turning or returning of a steering wheel is small compared to a steering operation state where the wheel steering velocity of turning or returning of the steering wheel is large; and in a case of judging that the holding operation state exists, keeping the hydraulic fluid ejection pressure of the pump constant so as to keep an inside hydraulic pressure of the power cylinder constant, wherein the pump is a reversible pump, wherein the reversible pump is adapted to be driven by an electric motor, the method comprising the further step of rotating the electric motor at a constant rate so that the reversible pump rotates at a constant rate to keep the inside pressure of the power cylinder constant, and in the case of judging that the holding operation state exists, controlling the electric motor so that a difference between an actual rotational velocity of the electric motor and a rotational velocity command value of the electric motor will become smaller.

11. A power assisting method of assisting a wheel steering force, by driving a hydraulic pump which uses a hydraulic fluid ejection pressure to generate a hydraulic pressure, and reciprocating a piston inside a power cylinder by the hydraulic pressure so as to generate the wheel steering force, comprising:

judging whether a holding operation state exists where a wheel steering velocity of turning or returning of a steering wheel is small compared to a steering operation state where the wheel steering velocity of turning or returning of the steering wheel is large; and in a case of judging that the holding operation state exists, keeping the hydraulic fluid ejection pressure of the pump constant so as to keep an inside hydraulic pressure of the power cylinder constant, wherein the pump is a reversible pump, wherein the reversible pump is adapted to be driven by an electric motor, the method comprising the further step of rotating the electric motor at a constant rate so that the reversible pump rotates at a constant rate to keep the inside pressure of the power cylinder constant, and, wherein the electric motor is adapted to be driven by a motor driver, and in the case of judging that the holding operation state exists, a first command to the electric motor increases according to a second command corresponding to the rotational velocity of the electric motor from the motor driver; and in a case of judging that the steering operation state exists, the first command to the electric motor is held constant although the second command increases corresponding to the rotational velocity of the electric motor from the motor driver.

* * * * *